March 6, 1962  A. LARDIN  3,024,070
EMERGENCY WHEEL DEVICE
Filed Jan. 25, 1960  3 Sheets-Sheet 1

INVENTOR.
ARTHUR LARDIN
BY Albert F. Kronman
ATTORNEY

March 6, 1962 A. LARDIN 3,024,070
EMERGENCY WHEEL DEVICE
Filed Jan. 25, 1960 3 Sheets-Sheet 2

INVENTOR.
ARTHUR LARDIN
BY
ATTORNEY

March 6, 1962  A. LARDIN  3,024,070
EMERGENCY WHEEL DEVICE
Filed Jan. 25, 1960  3 Sheets-Sheet 3

INVENTOR.
ARTHUR LARDIN
BY
ATTORNEY

United States Patent Office 3,024,070
Patented Mar. 6, 1962

3,024,070
EMERGENCY WHEEL DEVICE
Arthur Lardin, Hawkinsville, Ga., assignor to Breeze Corporations, Inc., Union, N.J., a corporation of New Jersey
Filed Jan. 25, 1960, Ser. No. 4,487
8 Claims. (Cl. 301—39)

This invention relates to an emergency wheel device for vehicles and specifically to a device which may be applied to the wheel of a pneumatic-tired vehicle which has developed a flat.

It is the present practice to provide vehicles having pneumatic tires with a spare wheel and tire mounted thereon to be used in the event of tire failure. However, the spare tire requires that the vehicle be jacked up, the flat removed, and the spare secured to the vehicle in its place. The tire changing operation in addition to being one which requires a certain amount of strength and facility with tools often involves a great deal of danger, particularly when the flat tire occurs on a busy highway. Where the road is not level, cars also roll off the jack with consequent damage to the vehicle and possible injury to the operator. Any attempt to drive the vehicle after the tire becomes flat results in the destruction of the tire and often of the wheel rim.

One proposed solution for the flat tire problem has been to provide tires with inner compartments which will either maintain the tire in a partially inflated state or which may be inflated, following a puncture, to carry the car for short distances. However, dependablity of compartmented tires rests upon the inner compartments remaining intact following the puncture. In addition, it is necessary with certain forms of compartment tires to inflate the inner compartment following a puncture of the outer compartment.

Another device which has been offered to eliminate the necessity for changing a flat tire is in the form of a flat disc-like member which may be bolted directly to the wheel of the flat tire and thereafter serve as a temporary wheel to drive the vehicle to a service station. This device, of course, requires that the vehicle be jacked up, in order to attach the auxiliary disc to the wheel. The use of this device is not only time consuming but potentially hazardous on a busy highway.

Still another solution which has been proposed for the flat tire problem is the provision of an auxiliary wheel which can be secured directly to the flat tire wheel, following which the vehicle can be driven off without danger to the pneumatic tire. Devices of this type have generally consisted of a flat plate which is secured to the hub or the vehicle wheel and which is slidably carried within the auxiliary wheel by spaced parallel guides or slots. As the vehicle is driven forward or backward and the wheel turned 90°, the flat plate slides between the opposed guides and brings the hub into alignment with the axle of the car. Thereupon, the plate is locked and the vehicle can be driven away. Such a structure is disclosed in Patent No. 2,863,703, issued to C. R. Knowle, December 9, 1959.

In order for an auxiliary wheel of this type to operate, however, it is necessary that the flat plate pass through a maximum angle of climb of 26°, 2 min. Assuming a 5" vertical climb of the plate in order to bring it into register with the hub of the wheel, there is required a coefficient of friction of approximaetly .488 between the auxiliary wheel and the road. A coefficient of friction of this magnitude can only be developed on the most favorable presently used surfaces. As a result, the auxiliary wheels slip and the vehicle is unable to lift itself enough to enable the auxiliary wheel to achieve the desired climb. Where the auxiliary wheel is applied to a rear tire the difficulty is further increased under certain conditions of low road friction by reason of the fact that the loss of traction of the opposite wheel prevents the disabled wheel from turning.

Accordingly, it is an object of the present invention to provide an emergency wheel structure for application to a flat tire which will eliminate the need for changing the flat in order to drive the vehicle to a service station.

Another object of the present invention is to provide an emergency wheel structure which may be applied directly to the flat tire wheel without requiring that the vehicle be jacked up.

Still another object of the present invention is to provide a light weight, simple emergency wheel structure which may be applied with a minimum amount of effort and time.

An object of the present invention is to provide an emergency wheel structure which may be used on a rear as well as a front wheel with equal effectiveness.

Another object of the present invention is to provide an emergency wheel structure which may be secured to a flat pneumatic-tire wheel without requiring the wheel to be rotated once the vehicle has stopped.

Still another object of the present invention is to provide an emergency wheel device which will be trouble-free, have a minimum number of parts, and require little skill for application to a vehicle.

A feature of the present invention is its use of a crank arm for bringing the emergency wheel disc into register with the vehicle wheel.

Another feature of the present invention is its use of a single, coupling screw for attaching the emergency wheel device to a vehicle wheel.

Still another feature of the present invention is its use of a splined adaptor whereby the emergency wheel structure can be secured to the vehicle wheel hub from any position in which the vehicle wheel may come to rest.

The invention consists of the construction, combination and arrangement of parts, as herein illustrated, described and claimed.

In the accompanying drawings, forming a part hereof is illustrated one form of embodiment of the invention, in which drawings similar reference characters designate corresponding parts and in which:

FIGURE 3 is a fragmentary view on a reduced scale taken on line 3—3 in FIGURE 2 looking in the direction of the arrows.

Figure 1:
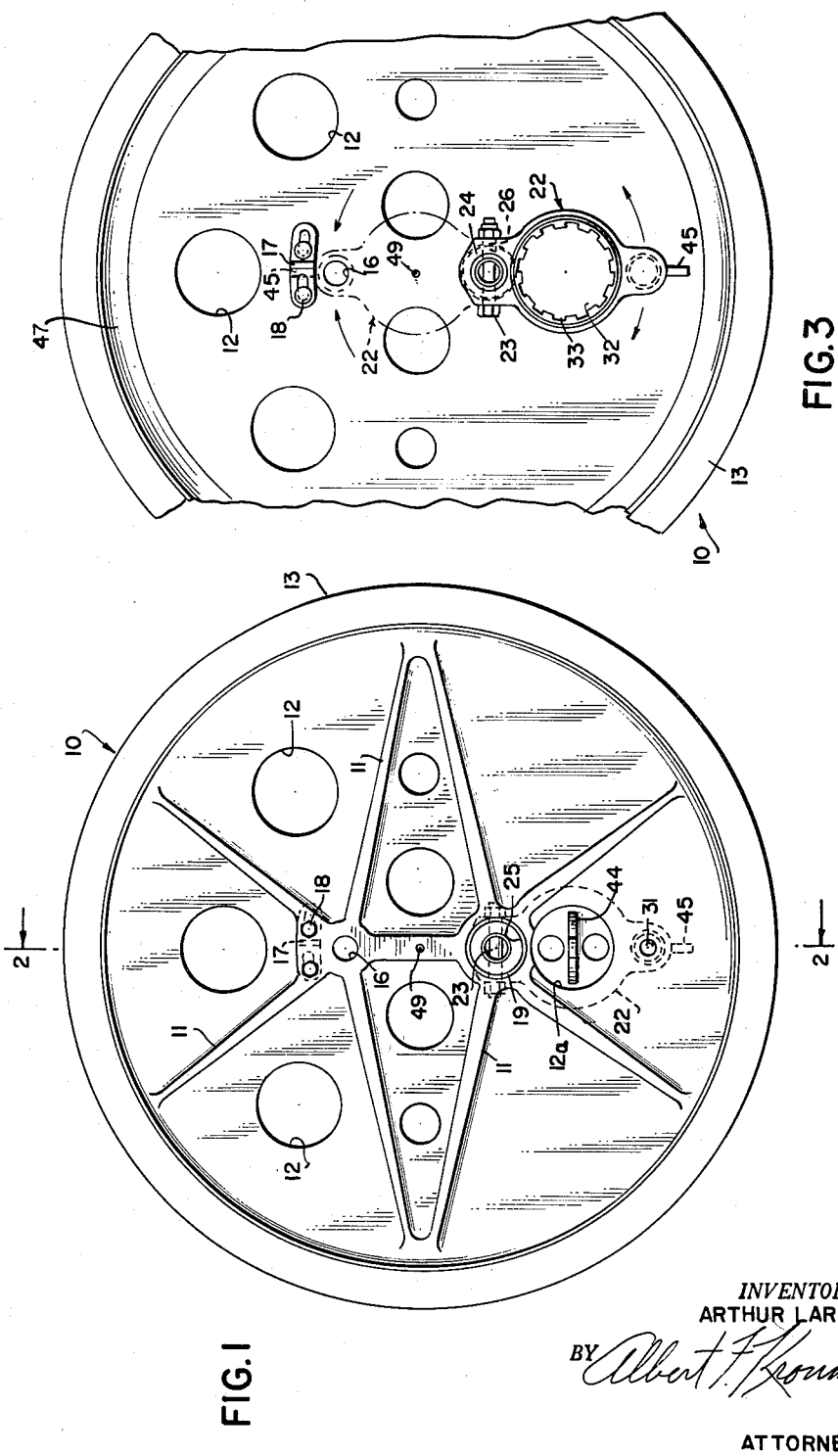
FIGURE 1 is a view in side elevation of a complete embodiment of the present invention with certain elements indicated in dashed lines to show the position thereof on the opposite side of the wheel disc.

Referring to the drawings, 10 indicates an emergency wheel disc, having a diameter not greater than that of the vehicle tire in its inflated condition. The disc 10 may be in the form of a thin plate having reinforcing ribs 11 on the outer face thereof. Weight reducing openings 12 are provided in the disc 10 as shown in FIGURE 1. A narrow tire 13, either of a solid rubber or pneumatic construction, is mounted or secured to the rim portion 14 of the disc 10. The rim 14 comprises a thickened portion of the disc 10 which underlies the tire 13. The inner face of the rim is beveled as indicated at 47 for a hereinafter disclosed purpose.

The disc 10 is provided with a small opening 15 and a larger opening 16, 180° away from the opening 15. The manner in which the openings 15, 16, cooperate in the operation of the emergency wheel will hereinafter be more fully set forth.

A stop member 17 is carried upon the inside of the disc 10 by means of screws 18 which project through the said disc.

Figure 2:
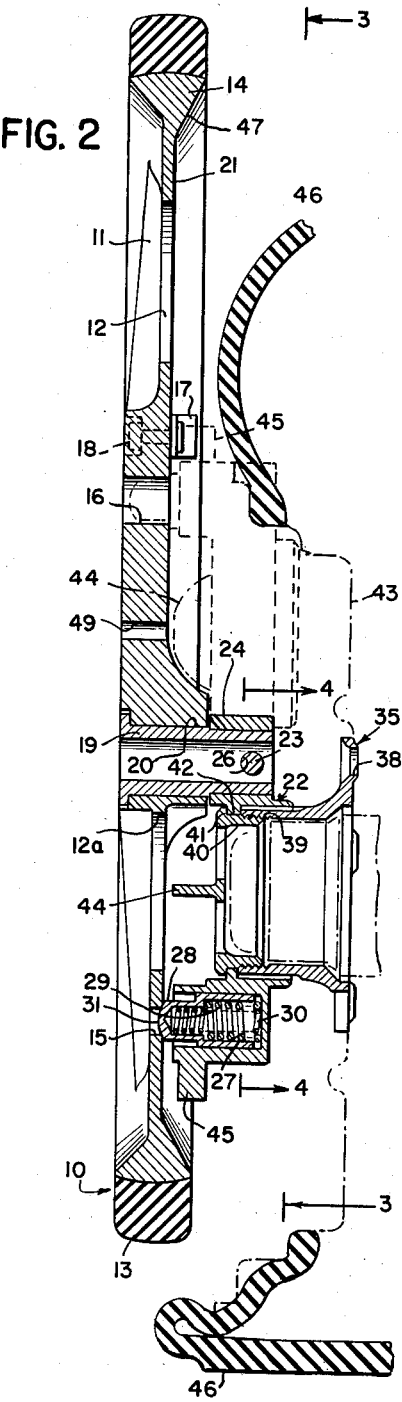
FIGURE 2 is a view in vertical section somewhat enlarged taken on line 2—2 in FIGURE 1, looking in the direction of the arrows.

The disc 10 freely supports a pivot pin 19, which extends through the disc 10 as shown in FIGURE 2 and beyond the inner face 21 thereof. The pivot pin is positioned between the openings 15 and 16. The disc 10 is thickened around the pivot pin 19 to form a large bearing surface 20 within the bore which freely supports the pivot pin 19.

A crank arm 22, best shown in FIGURES 2 and 3, is secured at one end to the pivot pin 19 by means of a transverse bolt 23. The crankarm 22 is provided with a bearing portion 24 having a bore 25 in which the pivot pin 19 is received. The bearing portion 24 is also transversely bored as indicated at 26 to receive the bolt 23. A recess 27 is provided in the crankarm 22 opposite the bearing portion 24. The recess 27 as shown in FIGURE 2, carries therein a plunger 28 which is urged in the direction of the disc 10 by springs 29, 30. The springs 29, 30, operate as a safety device to insure that the plunger 28 will always be pressed against the disc 10. When the emergency wheel device is in condition for application to a vehicle wheel, the plunger 28 will be resting in the small opening 15 in the disc 10. However, the plunger 28 is provided with a rounded nose portion 31, so that it may be cammed out of the opening 15 without difficulty.

The main or body portion of the crankarm 22 is formed with a large bore 32, having a plurality of splines 33 cut therein. The splines 33 are fashioned to receive complimentary splines 34 which are cut into the outer surface of an adapter 35.

Figure 4:
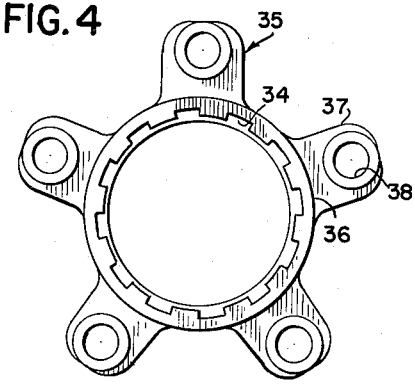
FIGURE 4 is a view in elevation of the adaptor element for securing the emergency wheel device to the wheel.
Figure 7:
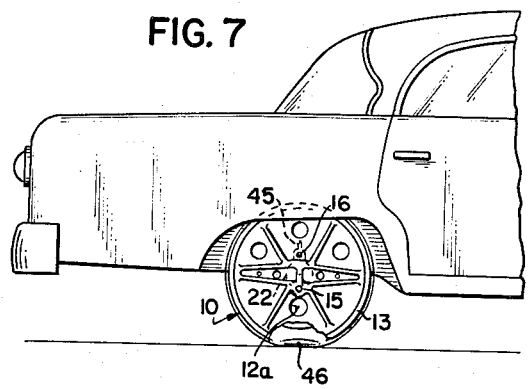
FIGURE 7 is a view in side elevation on a reduced scale showing the manner in which an emergency wheel made in accordance with the present invention is attached to a rear wheel of a vehicle.

The adapter 35, best shown in FIGURES 2 and 4, is of a somewhat flange-like configuration and is provided with a generally cyclindrical portion 36 and outwardly disposed ears 37. The ears 37 correspond in number to the studs on the vehicle wheel and are bored as indicated at 38 to receive the wheel studs therein. The cyclindrical portion 36, of the adapter 35 is internally threaded as indicated at 39 to receive a large coupling screw member 40.

The coupling screw member 40 is provided with a shoulder 41 having a larger diameter than the opening 12ᵃ in the disc 10. The shoulder 41 seats upon a boss 42 in the crankarm 22 when the said screw 40 is in threaded engagement with the adapter 35. The large coupling screw member 40 together with the splines 33, 34, serve to rigidly connect the crankarm and disc 10 to the adapter 35. It will be observed that no other screws, studs, or fastening means are required to effect this coupling.

In practicing the present invention, all four wheels 43, of the vehicle are fitted with adapters 35. This operation is easily carried out by removing the stud nuts of each wheel and slipping the adapter 35 over the studs on the wheel 43 and thereafter replacing the stud nuts. When a flat tire occurs, the driver merely removes the hub cap (not shown) from the vehicle wheel exposing the adapter 35. The emergency wheel structure is then placed along side the flat tire 45 and the splines 33 fitted onto splines 34 in the manner shown in FIGURE 2. Because of the large number of splines it is possible to slip the crankarm 22 into engagement with the adapter 35 with a minimum amount of rotation of the disc 10. The operator thereafter slips his hand through the opening 12ᵃ which is in register with the key portion 44 of the large coupling screw 40 and tightens the screw in place. The coupling screw 40 is captive between the boss 42 and the disc 10 by reason of the size of the shoulder 41. It has been found that a simple hand tightening of the screw 40 is sufficient to attach the emergency wheel to the vehicle since all of the torque in the emergency wheel is taken up by the splines 33, 34, and the pivot pin 19. The coupling screw 40 is only required to carry side loads.

With the emergency wheel in place, the driver then starts the vehicle and moves it either forward or back until the crankarm 22 has turned 180° with respect to the disc 10 as shown in dashed lines in FIGURE 2. At this juncture the plunger 28 will snap into the large opening 16 in the disc 10. The plunger will be urged into the opening 16 by the springs 29, 30. The small detent 45 on the crankarm 22 will encounter the stop member 17 and bring the crankarm 22 to rest as the plunger 28 comes into register with the opening 16. The stop member 17 is slidably carried between the screws 18 so that the plunger 28 will come into register with the opening 16 no matter which direction the wheel of the vehicle is rotated.

Figure 5:
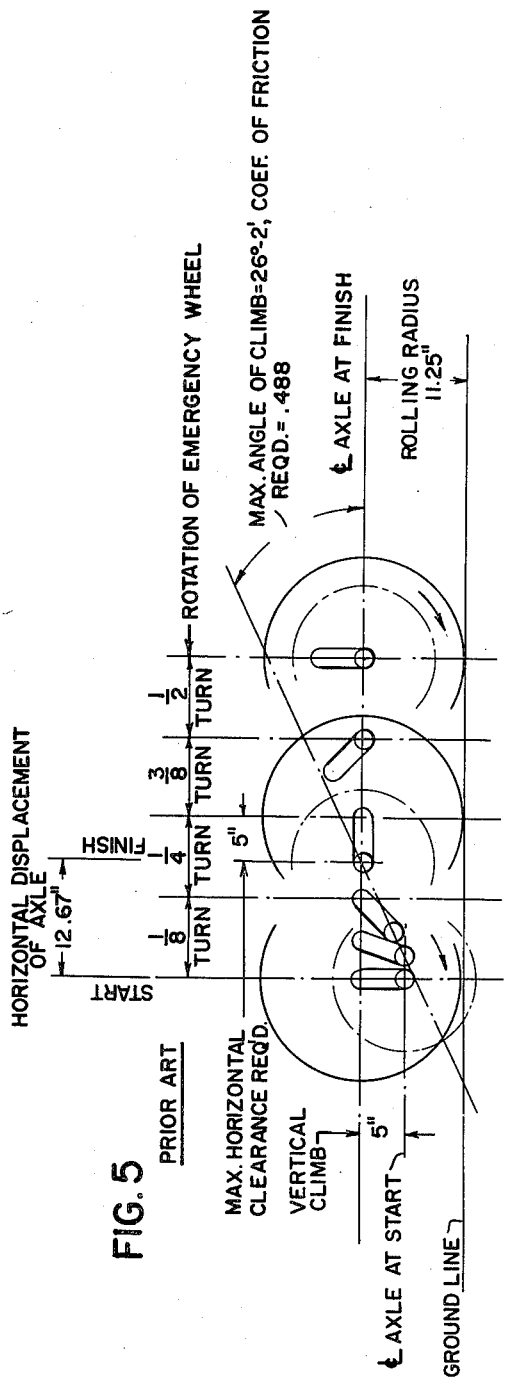
FIGURE 5 is a diagrammatic view of the operation of an emergency wheel made in accordance with the prior art devices.

In FIGURE 5 there is shown somewhat diagrammatically the manner in which prior art auxiliary wheel structures bring the supporting disc into alignment with the axle of the vehicle wheel. It will be understood that when the tire is flat, the center line of the wheel will be below normal center line of the said wheel and that the emergency wheel must be secured to the vehicle wheel in this position unless the vehicle is to be first raised by a jack. Since it is an object of the emergency wheels to eliminate the need for a jack, it is therefore necessary that the vehicle wheel be lifted as the disc of the emergency wheel rotates. Plotting the path of the hub of the vehicle wheel as the car moves forward or backward, and assuming a 5″ vertical climb from the flat tire position to the normal position, it will be seen that in those devices which provide for a shifting of the hub along the diameter of the wheel as shown in FIGURE 5, it is necessary for the hub to negotiate a maximum angle of climb of 26°, 2 min.

Figure 6:
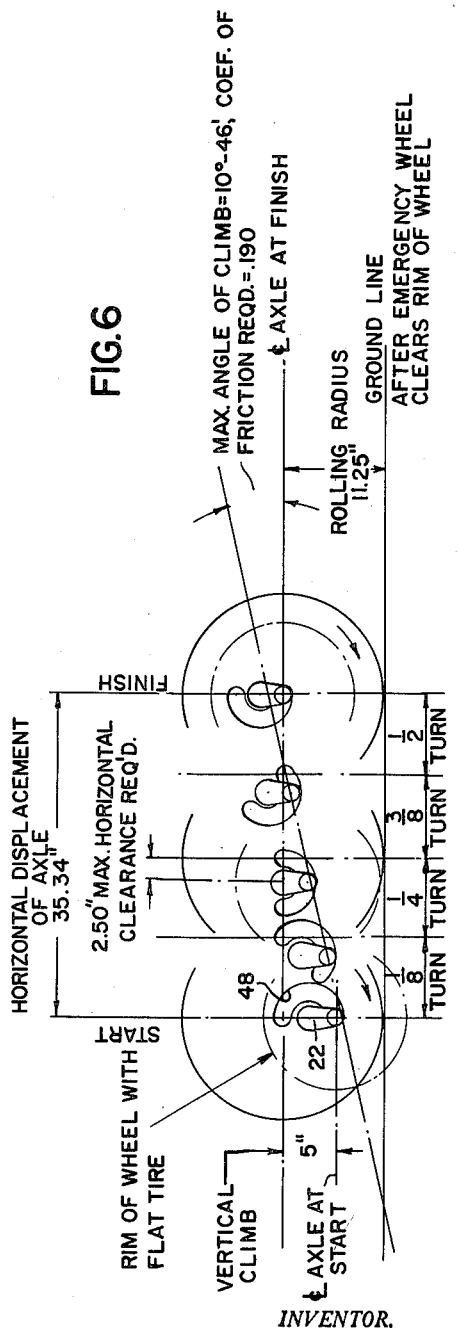
FIGURE 6 is a diagrammatic view similar to that of FIGURE 5, but illustrating the operation of an emergency wheel made in accordance with the present invention.

In FIGURE 6 there is shown a somewhat diagrammatic representation of the operation of an emergency wheel structure in accordance with the present invention. It will be seen that by reason of the crankarm 22 a camming action is achieved whereby the maximum angle of climb of the hub is only 10°, 46 min. Whereas the coefficient of friction required in FIGURE 5 is .488, the coefficient required of the present invention is .190. The lower coefficient is easily achieved and results in a highly efficient operation of the emergency wheel device whether it be on the front or rear wheels of the vehicle.

In addition, it will be observed that the maximum horizontal clearance required for the structure shown in FIGURE 5, is 5″. The maximum horizontal clearance required in the present device is 2.50″. Where vehicles are built with closely fitted fenders the structure shown in FIGURE 5 cannot be used. On the other hand, the smaller required clearance of the present structure makes it adaptable for use on rear wheels where clearance is at a minimum.

Still another difference between the present device and that of the prior art is that the horizontal displacement of the axle during the complete climb of the prior art structure is 12.67″. In a device made in accordance with the present invention the horizontal displacement of the axle is 35.34″. As a result of the rapid rise of the prior art device within the short horizontal distance, the vehicle wheel remains almost stationary and the auxiliary wheel climbs up on the bulge of the flat tire on the road, thereby tending to pull the tire off the wheel and also damage the said tire. The applicant's device, on the other hand, results in the wheel of the vehicle and the auxiliary disc rolling together for a short distance, following which, the wheel is gradually raised off the ground. The bulge of the flat tire is thus slowly pushed aside by the auxiliary device without damage to the said tire. The bevel 47 on the inside of the rim 14 further aids to protect and push the tire aside.

From the foregoing it will be seen that there has been provided an auxiliary emergency wheel device, which can be applied to a vehicle wheel with a minimum amount of time and without need for tools. The device is made with a minimum number of parts and substantially lighter in weight than the customary vehicle spare tire. In addition, the auxiliary wheel structure will function on a wide variety of surfaces, either on front or rear wheels and will not damage the flat vehicle tire by running over it.

When it is desired to restore the emergency wheel device to its initial position, following its use in connection with a flat tire, it is merely necessary to insert a rod into the opening 16, push the plunger 28 out of engagement with said opening, and thereafter turn the disc until the plunger 28 engages the small opening 15. The device is then ready for reuse. It will be understood that the resetting of the device will be carried out after the vehicle has been jacked up or after the emergency wheel device has been removed from the vehicle.

From an examination of FIGURES 1, 2, and 3, it will be seen that the pivot pin 19 is carried by the disc 10 so that it is offset from the geometric center 49 of the disc, a distance equal to one-half of the maximum eccentricity of the disc with respect to the wheel. As a result, when the crankarm 22 is swung with respect to the disc 10, from the position shown in full lines in FIGURE 2, to that indicated by dashed lines, the large bore 32 of the crankarm 22, the adapter 35 therein, and the disc 10, will all become concentric, and disposed along the horizontal axis of the vehicle wheel. In this position, the vehicle may be driven off upon the disc 10. It will be understood that the disc 10 may be slightly smaller than the pneumatic tire in its inflated condition and that the vehicle with the present device attached can be driven as though it were moving on a soft tire, once the disc is brought into concentricity with the vehicle wheel.

As shown in FIGURE 6 the weight of the vehicle to which the auxiliary wheel device is attached will maintain the crankarm substantially stationary as the disc 10 is moved forward. The operation of the crankarm 22 in being raised is in the nature of a camming action as indicated by the arcuate configuration 48, of FIGURE 6. Where the load on the vehicle wheel is not excessive, or where bearing friction on pin 19 is high, it is possible that there will be a certain amount of rotation of the crankarm 22, as the vehicle is moved. As the vehicle with the auxiliary wheel device attached moves forward or backward, the flat pneumatic-tired vehicle wheel is thus cammed into its elevated position in the gradual manner shown in FIGURE 6.

Having thus fully described the invention, what is claimed as new and desired to be secured by Letters Patent of the United States, is:

1. An emergency auxiliary wheel device for pneumatic-tired vehicle wheels comprising, a circular disc, a crankarm swingably and eccentrically secured on one side of the disc, an adapter axially carried by the vehicle wheel to receive the crank arm, means to secure the crankarm to the adapter and means to interlock the crankarm and the disc when the disc and adapter have been brought into concentricity by the crankarm in response to the rotation of the vehicle wheel.

2. An emergency auxiliary wheel device for pneumatic-tired vehicle wheels comprising, a circular disc, a pivot pin freely carried by the disc and extending therefrom, a crankarm swingably and eccentrically secured on the pivot pin on one side of the disc, an adapter axially carried by the vehicle wheel to receive the crank arm, means to secure the crankarm to the adapter and means to interlock the crankarm and the disc when the disc and adapter have been brought into concentricity by the crank arm in response to the rotation of the vehicle wheel.

3. A device according to claim 2 in which the pivot pin is positioned from the geometric center of the disc a distance equal to one-half the maximum eccentricity of the disc with respect to the wheel.

4. An emergency auxiliary wheel device for pneumatic-tired vehicle wheels comprising, a circular disc, a pivot pin freely carried by the disc and extending therefrom, a crankarm swingably and eccentrically secured on the pivot pin on one side of the disc, a bore in the crankarm spaced from the pin receiving portion thereof, an adapter axially carried by the vehicle wheel to receive the crank arm, means including the crankarm bore to secure the crankarm to the adapter and means to interlock the crankarm and the disc when the disc and adapter have been brought into concentricity by the crankarm in response to the rotation of the vehicle wheel.

5. An emergency auxiliary wheel device for pneumatic-tired vehicle wheels comprising, a circular disc, a pivot pin freely carried by the disc and extending therefrom, a crankarm swingably and eccentrically secured on the pivot pin on one side of the disc, a bore in the crankarm spaced from the pin receiving portion thereof, an adapter axially carried by the vehicle wheel to receive the crank arm, a recess in the crankarm, a plunger in said recess, means including the crankarm bore to secure the crankarm to the adapter and means including the crankarm plunger to interlock the crankarm and the disc when the disc and adapter have been brought into concentricity by the crankarm in response to the rotation of the vehicle wheel.

6. An emergency auxiliary wheel device for pneumatic-tired vehicle wheels comprising, a circular disc, a pivot pin freely carried by the disc and extending therefrom, a crankarm swingably and eccentrically secured on the pivot pin on one side of the disc, a bore in the crankarm spaced from the pin receiving portion thereof, a first opening in the disc on one side of the geometric center of the disc, a second opening in the disc 180° away from the first opening and on the opposite side of the geometric center of the disc, an adapter axially carried by the vehicle wheel to receive the crankarm, a recess in the crankarm, a plunger in said recess yieldably received within the first opening, means including the crankarm bore to secure the crankarm to the adapter and means including the crankarm plunger and the second opening to interlock the crankarm and the disc when the disc and adapter have been brought into concentricity by the crankarm in response to the rotation of the vehicle wheel.

7. An emergency auxiliary wheel device for pneumatic-tired vehicle wheels comprising, a circular disc, a pivot pin freely carried by the disc and extending therefrom, a crankarm swingably and eccentrically secured on the pivot pin on one side of the disc, a bore in the crankarm spaced from the pin receiving portion thereof, a plurality of splines in said bore, an adapter axially carried by the vehicle wheel to receive the crankarm, a cylindrical portion on said adapter, a plurality of splines on said cylindrical portion receivable within the crankarm bore splines, means comprising a coupling screw carried by the crankarm and a threaded portion within the adapter to secure the crankarm to the adapter and means to interlock the crankarm and the disc when the disc and adapter have been brought into concentricity by the crankarm in response to the rotation of the vehicle wheel.

8. An emergency auxiliary wheel device for pneumatic-tired vehicle wheels comprising, a circular disc, a pivot pin freely carried by the disc and extending therefrom, a crankarm swingably and eccentrically secured on the pivot pin on one side of the disc, a bore in the crankarm spaced from the pin receiving portion thereof, a plurality of splines in said bore, a first opening in the disc on one side of the geometric center of the disc, a second opening in the disc 180° away from the first opening and on the opposite side of the geometric center of the disc, an adapter axially carried by the vehicle wheel to receive the crankarm, a cylindrical portion on said adapter, a plurality of splines on said cylindrical portion receivable within the crankarm bore splines, a recess in the crankarm, a spring loaded plunger in said recess yieldably received within the first opening, means comprising a coupling screw carried by the crankarm and a threaded portion within the adapter to secure the crankarm to the adapter and means including the crankarm plunger and the second opening to interlock the crankarm and the disc when the disc and adapter have been brought into concentricity by the crankarm in response to the rotation of the vehicle wheel.

References Cited in the file of this patent

UNITED STATES PATENTS

| | | |
|---|---|---|
| 2,220,518 | Grasso | Nov. 5, 1940 |
| 2,483,574 | Craig | Oct. 4, 1949 |
| 2,863,703 | Null | Dec. 9, 1958 |

FOREIGN PATENTS

| | | |
|---|---|---|
| 500,460 | France | Dec. 17, 1919 |